US009393996B2

(12) United States Patent
Goswami et al.

(10) Patent No.: US 9,393,996 B2
(45) Date of Patent: Jul. 19, 2016

(54) REVERSE DRIVE ASSIST FOR LONG WHEELBASE DUAL AXLE TRAILERS

(71) Applicants: Ambarish Goswami, Fremont, CA (US); Jimmy Chiu, Sunnyvale, CA (US)

(72) Inventors: Ambarish Goswami, Fremont, CA (US); Jimmy Chiu, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 13/734,764

(22) Filed: Jan. 4, 2013

(65) Prior Publication Data

US 2013/0179038 A1  Jul. 11, 2013

Related U.S. Application Data

(60) Provisional application No. 61/583,960, filed on Jan. 6, 2012.

(51) Int. Cl.
| | |
|---|---|
| *B62D 6/00* | (2006.01) |
| *B62D 11/00* | (2006.01) |
| *B62D 12/00* | (2006.01) |
| *G05D 1/00* | (2006.01) |
| *G06F 7/00* | (2006.01) |
| *G06F 17/00* | (2006.01) |
| *G06F 19/00* | (2011.01) |
| *B62D 5/04* | (2006.01) |
| *B62D 13/06* | (2006.01) |

(Continued)

(52) U.S. Cl.
CPC ...... *B62D 13/06* (2013.01); *B62D 5/04* (2013.01); *B62D 13/005* (2013.01); *B62D 13/025* (2013.01)

(58) Field of Classification Search
CPC .................................. B62D 13/06; B62D 1/00

USPC ............... 340/431; 172/2; 701/42; 180/445
See application file for complete search history.

(56) References Cited

U.S. PATENT DOCUMENTS

| | | | |
|---|---|---|---|
| 4,208,063 A | 6/1980 | Baker et al. | |
| 5,247,442 A | 9/1993 | Kendall | |
| 6,292,094 B1* | 9/2001 | Deng et al. | 340/431 |

(Continued)

FOREIGN PATENT DOCUMENTS

| | | |
|---|---|---|
| JP | 11-124051 A | 5/1999 |
| JP | 11-240461 A | 9/1999 |
| JP | 2003-118614 A | 4/2003 |

OTHER PUBLICATIONS

Bouteldja, M. et al., "Prediction and Detection of Jackknifing Problems for Tractor Semi-Trailer," *IEEE Vehicle Power and Propulsion Conference*, Sep. 2006, pp. 1-6, Windsor, Canada.

(Continued)

*Primary Examiner* — Helal A Algahaim
*Assistant Examiner* — Mahmoud Ismail
(74) *Attorney, Agent, or Firm* — Arent Fox LLP

(57) ABSTRACT

A controller and control method assists a driver with backing up of a vehicle with an attached trailer. The vehicle has a front axle with steerable front wheels controlled by the driver and a rear axle with non-steerable rear wheels. The trailer has a front axle with non-steerable front wheels and a rear axle with steerable rear wheels controlled by a trailer steering controller. The controller receives an operator-controlled vehicle steering angle and a measured hitch angle. The controller determines a trailer steering angle based on the operator-controller vehicle steering angle and the measured hitch angle. The controller continuously controls the trailer (e.g., via a steering angle of the rear wheels) to maintain a trajectory with substantially no lateral slippage.

22 Claims, 7 Drawing Sheets

(51) Int. Cl.
B62D 13/00 (2006.01)
B62D 13/02 (2006.01)

(56) References Cited

U.S. PATENT DOCUMENTS

| | | | |
|---|---|---|---|
| 6,854,557 B1 * | 2/2005 | Deng et al. | 180/445 |
| 7,694,993 B2 | 4/2010 | Timmons, Jr. | |
| 8,068,967 B2 | 11/2011 | Schutz et al. | |
| 2007/0058273 A1 | 3/2007 | Ito et al. | |
| 2009/0032273 A1 * | 2/2009 | Hahn | 172/2 |

OTHER PUBLICATIONS

Jayakaran, A.D., "Enhanced trailer backing," Master of Science Thesis, 2004, University of Florida, USA, eight-six pages.

Jujnovich, B. et al., "Implementation of Active Rear Steering of a Tractor—Semi-Trailer," *Proceedings of the International Conference on Heavy Vehicles*, 2008, pp. 358-367, Paris, France.

Law, M., "Trailer Reverse Control System," Final Year Project [Date Unknown], Department of Electronic Engineering, National University of Ireland, Galway, forty-three pages.

Leng, Z. et al., "A Simple Tractor-Trailer Backing Control Law for Path Following with Side-Slope Compensation," *IEEE International Conference on Robotics and Automation*, May 9-13, 2011, pp. 2386-2391, Shanghai, China.

Matsushita, K., "Nonholonomic Equivalent Disturbance Based Backward Motion Control of Tractor-Trailer with Virtual Steering," *IEEE Transactions on Industrial Electronics*, Jan. 2008, pp. 280-287, vol. 55, No. 1.

Paromtchik, L.E., "Steering and Velocity Commands for Parking Assistance," *Proceedings of the 10$^{th}$ IASTED International Conference on Robotics and Applications*, Aug. 23-25, 2004, pp. 178-183, Honolulu, Hawaii, USA.

PCT International Search Report and Written Opinion, PCT Application No. PCT/IB2013/000310, Jun. 18, 2013, seven pages.

Pradalier, C. et al., "A simple and efficient control scheme to reverse a tractor-trailer system on a trajectory," *IEEE International Conference on Robotics and Automation*, Apr. 10-14, 2007, pp. 2208-2214, Rome, Italy.

Pradalier, C. et al., "Path planning for a Parking Assistance System: Implementation and Experimentation," *Australasian Conference on Robotics and Automation*, 2005, University of New South Wales, Australia, ten pages.

Pradalier, C. et al., "Robust Trajectory Tracking for a Reversing Tractor-Trailer System," *Journal of Field Robotics*, 2008, pp. 378-399, vol. 25, No. 6-7.

Stergiopoulos, J. et al., "Anti-jackknife state feedback control law for nonholonomic vehicles with trailer sliding mechanism," *International Journal of Systems, Control and Communications*, 2009, pp. 297-311, vol. 1, No. 3.

* cited by examiner

REVERSE DRIVE ASSIST FOR LONG WHEELBASE DUAL AXLE TRAILERS

RELATED APPLICATIONS

This application claims the benefit of U.S. provisional application No. 61/583,960 entitled "Reverse Drive Assist for Long Wheelbase Dual Axle Trailers" filed on Jan. 6, 2012, the content of which is incorporated by reference herein in its entirety.

BACKGROUND

The act of backing up a vehicle with an attached trailer can be a challenging maneuver even for individuals with considerable driving experience. Such maneuvers often require counterintuitive inputs, making them error-prone, cumbersome, frustrating, and dangerous, especially for inexperienced drivers. A common mistake when backing up a vehicle and trailer is to "jack knife" or "bind" the vehicle and trailer during the reverse motion. When this occurs, the driver is prevented from being able to steer the vehicle and trailer any further along its desired path. Backup maneuvers are particularly difficult with long wheelbase dual-axle trailers (as compared to single axle trailers), thus leaving the driver even more prone to jack knifing or binding.

Application Summary

A controller and method controls steering of a trailer in a reverse drive maneuver. A trailer and a vehicle are coupled at a hitch. The vehicle has a front axle with steerable front wheels and a rear axle with non-steerable rear wheels. The trailer has a rear axle with steerable rear wheels and a front axle with non-steerable front wheels. A controller receives an operator-controlled vehicle steering angle for steering the vehicle during the reverse drive maneuver. The controller furthermore receives a measured hitch angle representing an angle between the vehicle and the trailer at the hitch. The controller determines a trailer steering angle that causes the trailer to follow a trajectory with substantially no lateral slippage given the hitch angle and the operator-controlled vehicle steering angle. Steering of the trailer is then controlled using the trailer steering angle during the reverse drive maneuver.

In one embodiment, the controller maps the operator-controlled vehicle steering angle to a reference hitch angle and a feedforward reference trailer steering angle according to a predetermined mapping. For example, in one embodiment, the operator-controller vehicle steering angle is mapped to a point on a no-slip curve in a three-dimensional hitch space. The controller generates a steering compensation signal based on a difference between the reference hitch angle and the measured hitch angle. The controller then generates a trailer steering angle based on the feedforward reference trailer steering angle and the steering compensation signal.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
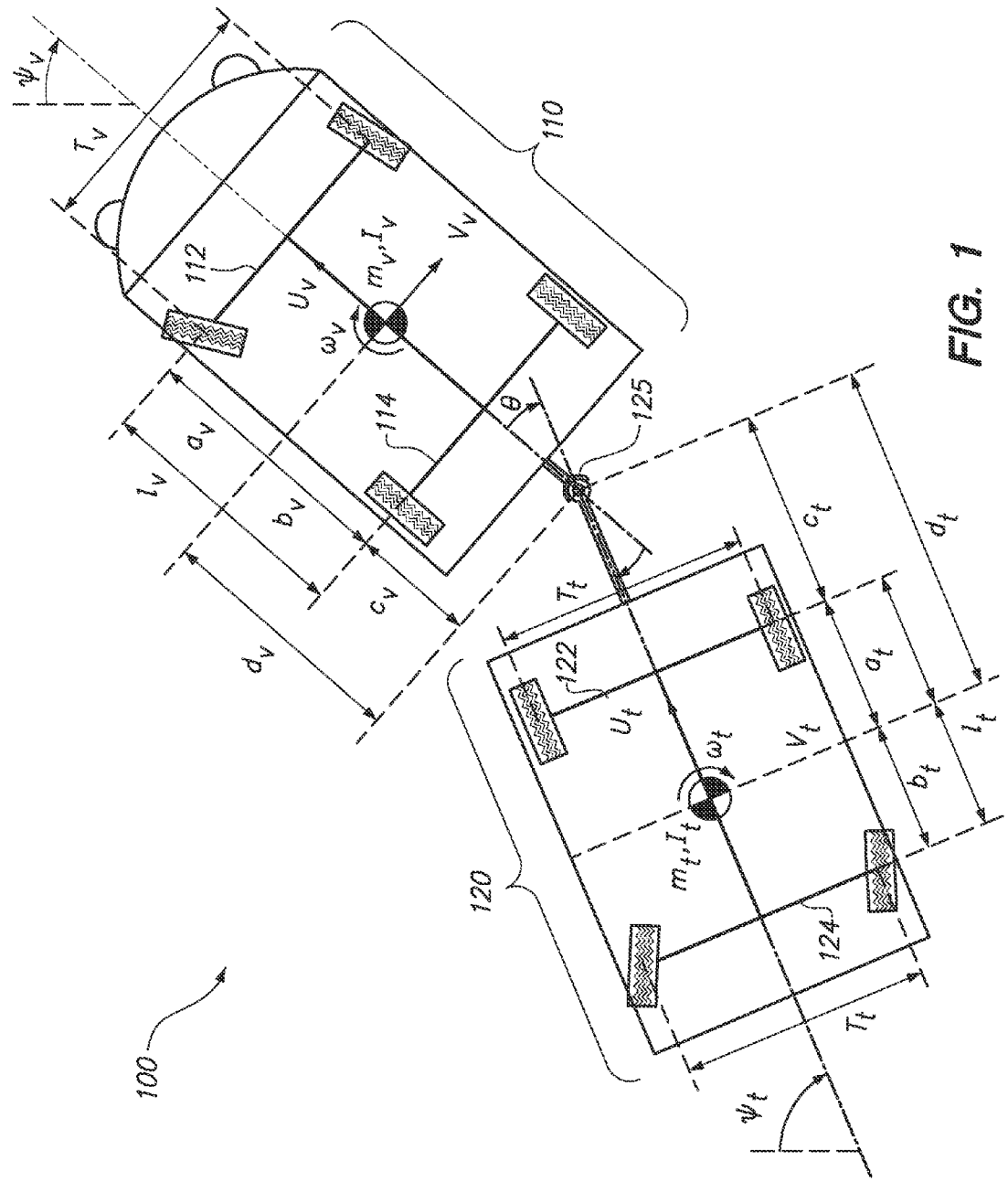
FIG. 1 is a geometric model of a vehicle with an attached trailer at a hitch point in accordance with an embodiment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION OF EMBODIMENTS

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Overview

A controller and control method assists a driver with backing up of a vehicle with an attached trailer. The vehicle has a rear axle with non-steerable rear wheels and a front axle with steerable front wheels controlled by the driver. The trailer has a front axle with non-steerable front wheels and a rear axle with steerable rear wheels controlled by a trailer steering controller. In a semi-autonomous backing up scenario, the driver fully controls steering and speed of the vehicle during the backup maneuver while the controller automatically controls steering of the trailer in response to the driver's actions. The controller continuously controls the trailer (e.g., via a steering angle of the rear wheels) according to an optimality principle and/or other quality criteria, while avoiding binding and jack-knifing. This control strategy enables even an inexperienced driver to execute complex maneuvers such as, for example, backing up through a 90 degree corner or backing up through a five cone slalom.

In one embodiment, the controller controls steering of the trailer in response to the driver's actions to geometrically satisfy the non-holonomic constraint. Particularly, the controller controls steering to maintain a trajectory with substantially no lateral slipping of the wheels. Controlling the trailer under "no-slip" conditions stabilizes the motion and avoids jackknifing and binding. Furthermore, movement under no-slip conditions beneficially reduces waste energy and minimizes tire wear.

FIG. 1 is a geometric model of a vehicle and trailer system 100 having a vehicle 110 coupled to a trailer 120 at a hitch point 125. The vehicle 110 comprises a dual-axle vehicle with a front axle 112 and a rear axle 114. The front wheels (coupled to the front axle 112) are steerable and the rear wheels (coupled to the rear axle 114) are not. The trailer 120 comprises a dual-axle trailer with a front axle 122 having non-steerable front wheels and a rear axle 124 having steerable rear wheels. The vehicle 110 and trailer 120 are connected by a single degree-of-freedom un-actuated hitch 125. The hitch 125 allows relative yaw motion between the vehicle 110 and the trailer 120 about a horizontal planar surface.

The vehicle 110 has a mass $m_v$, track width $T_v$ (i.e., a distance between the wheels on a given axle), and a wheel base (i.e., a distance between the axles) $l_v = a_v + b_v$, where $a_v$ is a longitudinal distance from the vehicle's center of mass (CoM) to the front axle 112, and $b_v$ is a longitudinal distance from the vehicle's CoM to the rear axle 114. The longitudinal distance from the rear axle 114 of the vehicle 110 to the hitch point 125 is represented by $c_v$. The longitudinal distance from the vehicle's CoM to the hitch point 125 is represented by $d_v = b_v + c_v$. $U_v$ and $V_v$ represent the velocity vectors of the vehicle's CoM in the longitudinal and lateral directions respectively. $\psi_v$ represents the global yaw angle of the vehicle 110 measured clockwise positive from vertical when viewed from the top. $\omega_v = \dot{\psi}_v$ represents the yaw rate of the vehicle 110. $I_v$ represents the vehicle yaw moment of inertia about the CoM.

The trailer 120 has a mass $m_t$, a track width $T_t$, and a wheel base $l_t = a_t + b_t$, where $a_t$ is a longitudinal distance from the trailer's center of mass (CoM) to the front axle 122, and $b_t$ is a longitudinal distance from the trailer's CoM to the rear axle 124. The longitudinal distance from the front axle 122 of the trailer 120 to the hitch point 125 is represented by $c_t$. The longitudinal distance from the trailer's CoM to the hitch point 125 is represented by $d_t = a_t + c_t$. $U_t$ and $V_t$ represent the velocity vectors of the trailer's CoM in the longitudinal and lateral directions respectively. $\psi_t$ represents the global yaw angle of the trailer 120 measured clockwise positive from vertical when viewed from the top. $\omega_t = \dot{\psi}_t$ represents the yaw rate of the trailer 120. $I_t$ represents the trailer yaw moment of inertia about the CoM.

The vehicle 110 and the trailer 120 form an angle $\theta = \psi_t - \psi_v$ at the hitch point 125 measured clockwise positive when viewed from the top. The hitch angle $\theta$ is thus equivalent to the relative orientation of the trailer 120 relative to the vehicle 110.

Figure 2:
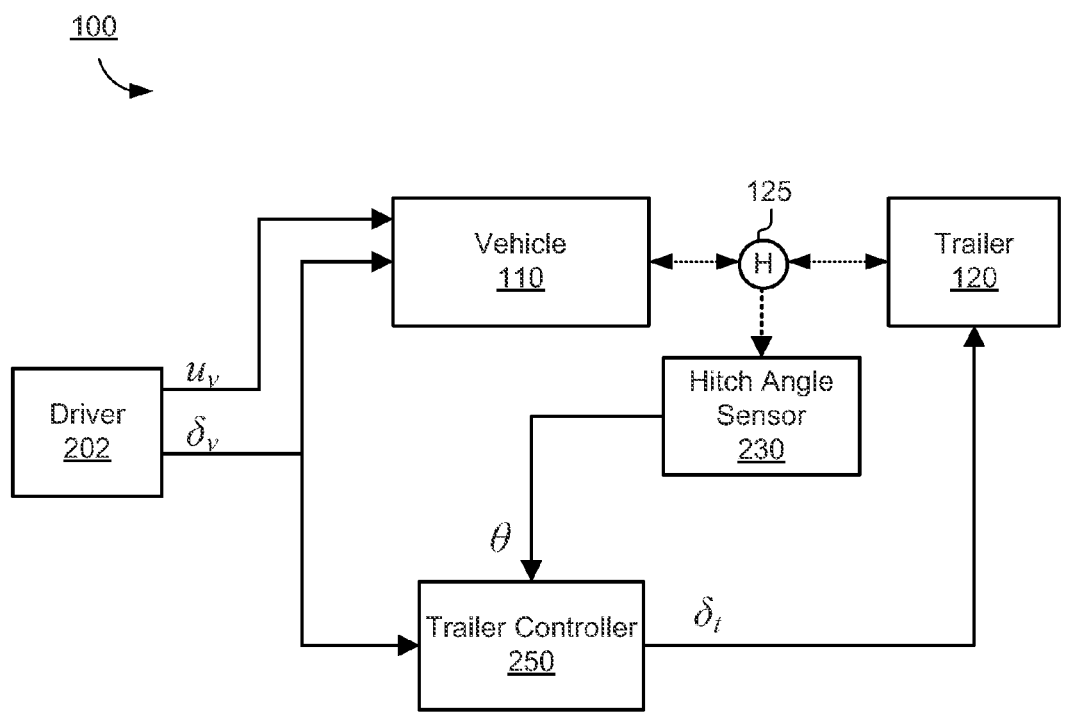
FIG. 2 is a block diagram of a vehicle/trailer system in accordance with an embodiment.

FIG. 2 is a block diagram representation of the vehicle/trailer system 100. A driver 202 provides inputs that control a steering angle $\delta_v$ (e.g., using a steering wheel) and a forward velocity $U_v$ in the steered direction (e.g., using the gas pedal) for driving the vehicle 110. A hitch angle θ represents the difference in the global yaw angles between the vehicle 110 and the trailer 120, defined herein from the symmetry axis of the trailer 120 to that of the vehicle 110. This hitch angle θ is sensed by the hitch angle sensor 230. The sensed hitch angle θ and the vehicle steering angle $\delta_v$ are provided to a trailer controller 250 which generates a trailer steering angle $\delta_t$ that controls steering of the trailer 120. For example, in one embodiment, the trailer controller 250 sends a signal to an actuator controller of the trailer that controls a steering actuator coupled to the rear wheels.

The controller 250 determines the steering angle $\delta_t$ of the trailer such that vehicle 110 and trailer 120 substantially follow the desired path of the driver 202 while avoiding binding or jackknifing during reverse maneuvers. For example, in one embodiment, the controller 250 controls the trailer steering angle $\delta_t$ of the rear wheels of the trailer in order to maintain the vehicle and trailer substantially under no slip conditions as will be described in further detail below.

The controller 250 may be implemented, for example, as an integrated circuit or a combination of integrated circuits. In one embodiment, the controller 250 comprises one or more processors and a computer-readable storage medium that stores computer-executable instructions that when executed by the one or more processors, carry out the functions attributed to the controller 250 described herein. Alternatively, the controller 250 may be implemented as an application specific integrated circuit (ASIC), a field programmable gate array (FPGA), or using a combination of software, hardware, and firmware components.

Figure 3:
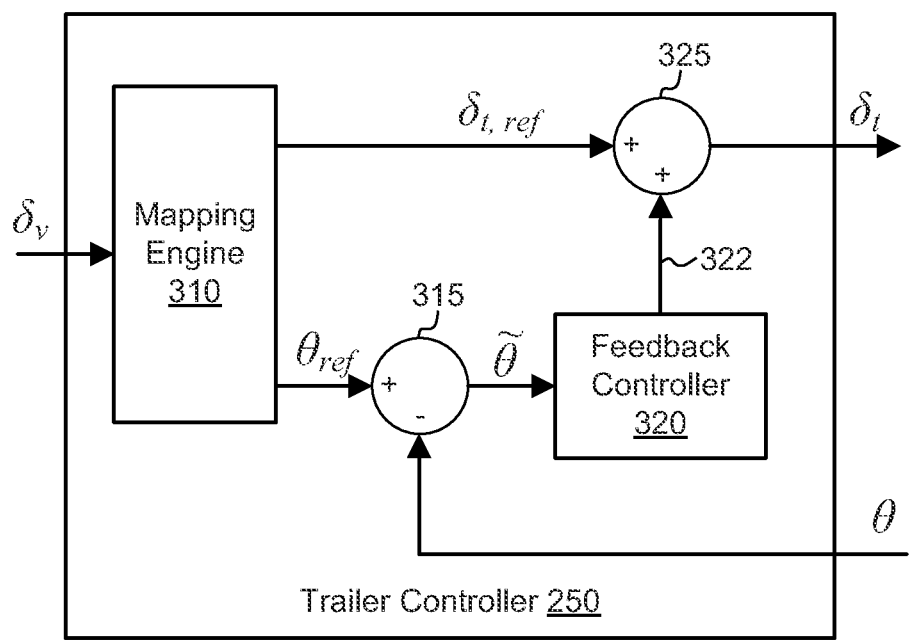
FIG. 3 is a block diagram of a trailer controller for controlling steering of a trailer in accordance with an embodiment.

FIG. 3 is a block diagram illustrating an embodiment of the trailer controller 250. In one embodiment, the trailer controller 250 comprises a mapping engine 310, a feedback controller 320, a first combiner 315, and a second combiner 325. The mapping engine 310 maps the operator-controlled vehicle steering angle $\delta_v$ to a feedforward reference trailer steering angle $\delta_{t,ref}$ and a reference hitch angle $\theta_{ref}$. The first combiner 315 determines a hitch angle error signal $\tilde{\theta}$ representing a difference between the reference hitch angle $\theta_{ref}$ determined by the mapping engine 310 and the measured hitch angle θ (e.g., $\tilde{\theta}=\theta_{ref}-\theta$). The feedback controller 320 receives the hitch angle error $\tilde{\theta}$ and generates a compensation signal 322 based on the hitch angle error signal $\tilde{\theta}$. The second combiner 325 combines the compensation signal 322 (e.g., summing) with the feedforward trailer reference steering angle $\delta_{t,ref}$ to generate the trailer steering angle $\delta_t$ used to control the trailer steering.

In one embodiment, the feedback controller 320 applies a proportional-integral feedback control feedback control technique that generate the compensation signal 322 based on a proportional gain and an integral gain of the hitch angle error signal $\tilde{\theta}$. For example, in one embodiment, the feedback controller 320 and the combiner 325 collectively generate the trailer steering angle $\delta_t$ as:

$$\delta_t = \delta_{t,r} + K_p\tilde{\theta} + K_i\int\tilde{\theta}dt \quad (1)$$

where $K_p$ is the proportional gain and $K_i$ is the integral gain for the feedback controller 320. In this embodiment, the closed loop linearized system is given by:

$$\dot{x} = Ax + B_{\delta_v}\cdot\delta_v + B_{\delta_t}\cdot\delta_t$$

$$\theta = C_\theta x = [0\ 0\ 1\ 0]x$$

$$\dot{x}_c = \tilde{\theta} = \theta_r - \theta$$

$$\delta_t = \delta_{t,r} + K_p\tilde{\theta} + K_i x_c \quad (2)$$

where x is the system state vector defined to be the following states: $[V_v, \omega_v, \theta, \dot{\theta}]^T$, $\dot{\theta}$ is the hitch angle rate of change, A is the state matrix of the linearized system, $B_{\delta_t}$ the trailer steering input matrix, $B_{\delta_v}$ is the vehicle steering input matrix, $C_\theta$ is the hitch angle output matrix, and $\theta_r=f_1(\delta_v)$, $\delta_{t,r}=f_2(\delta_v)$ are the reference angles for articulation and rear steering under non-holonomy respectively, dependent on the vehicle steering angle $\delta_v$. The closed loop system matrix $A_{CL}$ is given by:

$$A_{CL} = \begin{bmatrix} A - K_p B_{\delta_t} C_\theta & K_i B_{\delta_t} \\ -C_\theta & 0 \end{bmatrix} \quad (3)$$

If all of the closed loop eigenvalues have negative real components, then the linearized system is stable for given controller gains $K_p$ and $K_i$.

In another embodiment, the feedback controller 320 instead uses a proportional-integral-derivative feedback control technique. Here, the controller 320 generates the compensation signal 322 based on a proportional gain, an integral gain, and a derivative gain of the hitch angle error signal $\tilde{\theta}$. In this embodiment, the linearized closed loop system becomes:

$$\dot{x} = Ax + B_{\delta_v}\cdot\delta_v + B_{\delta_t}\cdot\delta_t$$

$$\dot{\theta} = C_\theta x = [0\ 0\ 1\ 0]x$$

$$\ddot{x}_c = \dot{\tilde{\theta}} = \dot{\theta}_r - \dot{\theta}$$

$$\delta_t = \delta_{t,r} + K_p \dot{x}_c + K_i x_c + K_d\dot{\tilde{\theta}} \quad (4)$$

with closed loop system matrix $A_{CL}$ given by:

$$A_{CL} = \begin{bmatrix} A - K_d B_{\delta_t} C_\theta & K_i B_{\delta_t} & K_p B_{\delta_t} \\ 0 & 0 & 1 \\ -C_\theta & 0 & 0 \end{bmatrix} \quad (5)$$

Generally, the controller 250 does not directly control the hitch angle θ. However, both $\delta_v$ and $\delta_t$ affect the lateral loads of the front vehicle axle and the rear trailer axle respectively, which affects yaw accelerations $\dot{\omega}_v$ and $\dot{\omega}_t$ of the vehicle and trailer, respectively, and therefore provides an indirect way of controlling the hitch angle θ. In an alternative embodiment, the controller 250 could directly control the hitch angle θ by applying torques to the hitch mechanism.

In one embodiment, the controller 250 periodically samples the input steering angle $\delta_v$ and the measured hitch angle θ and periodically updates the output steering angle $\delta_t$ in response. Thus, during each iteration, the controller 250 determines the output steering angle $\delta_t$ that will best move the operating point of the vehicle towards the desired operating condition (e.g., along the no-slip curve).

Figure 4:
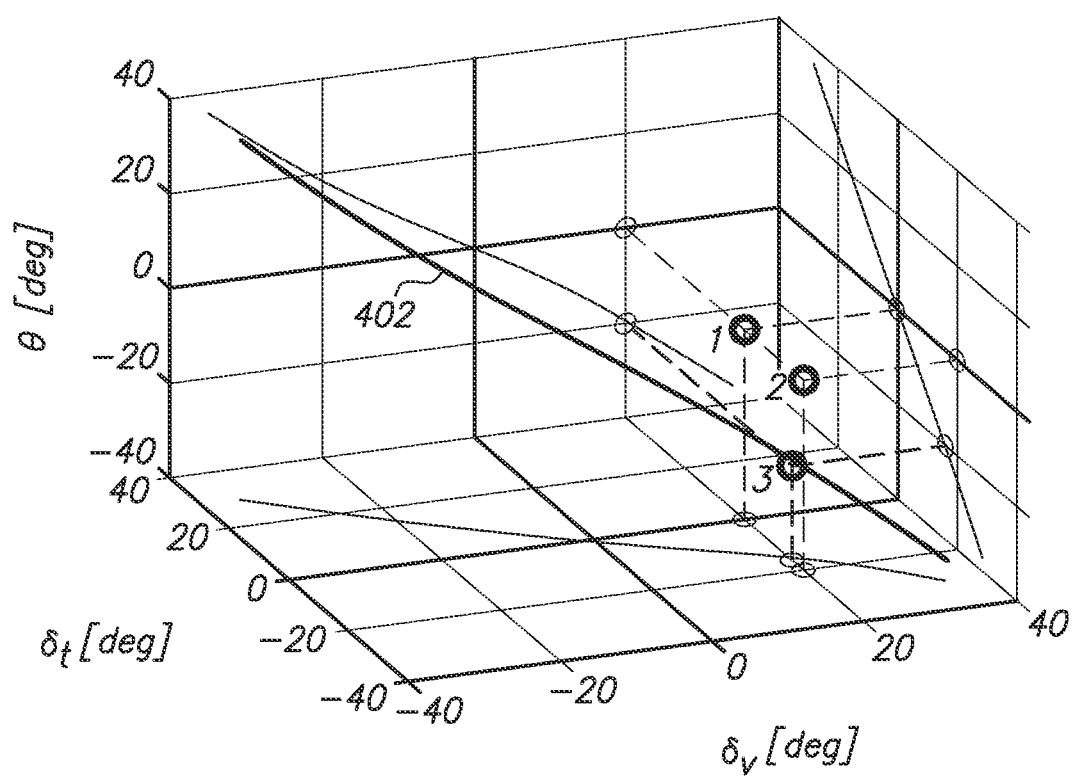
FIG. 4 is a graph illustrating a control method for controlling steering of a trailer to control movement along a predefined curve in a three-dimensional hitch space in accordance with an embodiment.

FIG. 4 illustrates an example control strategy of the controller 250. Particularly, FIG. 4 illustrates a no-slip curve 402 in a "hitch control space" having a vehicle steering angle axis ($\delta_v$ [deg]), a trailer steering angle axis ($\delta_t$[deg]), and a hitch angle axis (θ[deg]). The no slip curve 402 represents the set of points ($\delta_v$, $\delta_t$, θ) corresponding to a state of the vehicle/trailer system 100 in which the vehicle 110 and trailer 120 can move without lateral slipping. At an initial point (1), the driver commands an initial vehicle steering angle $\delta_v$. The mapping engine 210 uses a predefined mapping to map the steering angle 8V to a reference trailer steering angle $\delta_{t,ref}$ and a reference hitch angle $\theta_{ref}$. For example, the mapping engine 250 applies a mapping such that the the point $(\delta_v, \delta_{t,ref}, \theta_{ref})$ corresponds to a point on the no-slip curve 402 (e.g., a point (3) in FIG. 4).

It is observed that it is not always possible to go directly from point (1) to point (3) because the hitch angle $\theta$ is not directly controlled. For example, if $\delta_t$ is directly set to $\delta_{t,ref}$, the hitch angle $\theta$ will not necessarily reach the desired reference angle $\theta_{ref}$. Thus, in one embodiment the parameters of the feedback controller 320 are set to ensure that $|\delta_t|>|\delta_{t,ref}|$. This initial overcompensation of the trailer steering angle $\delta_t$ will cause the hitch angle $\theta$ to move towards $\theta_{ref}$. For example, the operating point may move from the initial operating point (1) to an intermediate point (2) in which $|\delta_t|>|\delta_{t,ref}|$. Then, as the hitch angle $\theta$ moves towards $\theta_{ref}$, trailer steering angle $\delta_t$ is further adjusted such that the final operating point (3) lies on the no slip curve 402. Once the system state reaches the no-slip curve, the controller 250 continuously adjusts the trailer steering angle $\delta_t$ to keep the system close to or on the no-slip curve 402 regardless of changes in the vehicle steering input $\delta_v$.

While the no-slip curve 402 theoretically represents an operating state with no lateral slipping, references herein to a "no slip curve" may also include an approximation of a true no-slip curve in which some small lateral slippage may still occur. For example, in one embodiment, a linear approximation of a no-slip curve is applied by the mapping engine 210. In another embodiment, a different approximation may be used (e.g., a second order approximation). Furthermore, due to practical limitations of the controller 250, the operating point may not always be maintained precisely on the no-slip curve 402 but may vary somewhat within the vicinity of the no-slip curve 402. Thus, reference herein to an operating state in which "substantially" no lateral slippage occurs refers to operation near the no-slip curve (which may be an approximated no-slip curve) in which some deviation may still occur during normal operation. For example, in one embodiment, the controller 250 maintains the operating state to within five degrees of the no-slip curve 402. Alternatively, controllers 250 with different tolerances may be used (e.g., 3 degrees, 10 degrees, 15 degrees, 20 degrees, etc.).

Furthermore, depending on the initial conditions of the vehicle/trailer system 100, some initialization period may pass before the trailer/vehicle system 100 are adjusted to operate on or near the no-slip curve 402. For example, as illustrated in FIG. 4, the initial operating point (1) may be far from the no-slip curve 402, and the controller 250 does not immediately adjust the operating position to a point on the no-slip curve 402 because it does not directly control the hitch angle $\theta$. Therefore, some initial period may pass during which the controller 250 causes the vehicle/trailer system 100 to move closer to the operating point on the no-slip curve (3) through one or more intermediate points (e.g., point (2)). Derivation of the no-slip curve is described in further detail below.

No-Slip Curve

Figure 5:
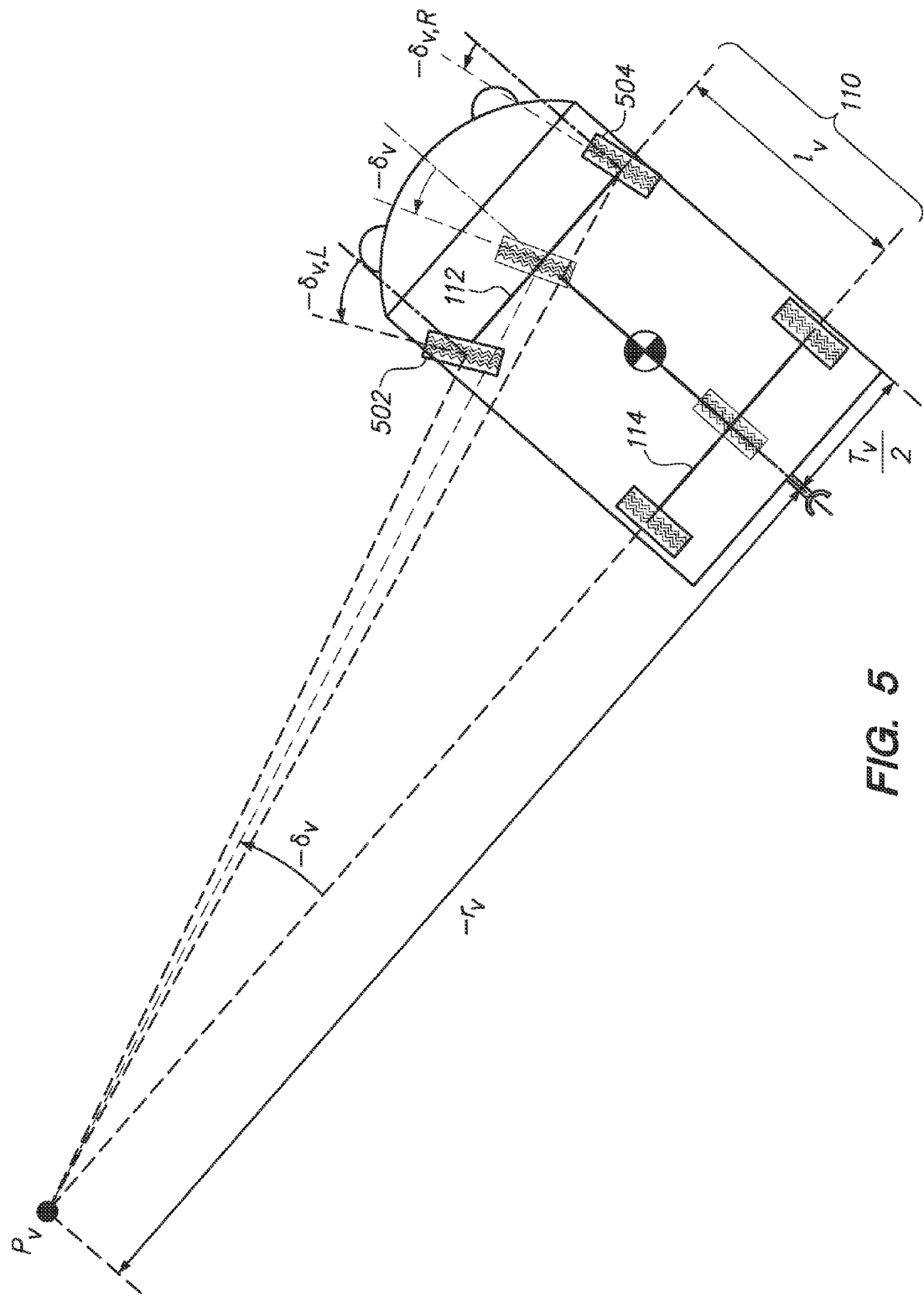
FIG. 5 is a geometric model of a vehicle and a bicycle model of the vehicle in accordance with an embodiment.

FIG. 5 is a geometric model of a vehicle 110 that illustrates the vehicle kinematics. Also illustrated in FIG. 5 is a "bicycle model" of the vehicle 110 in which the vehicle 110 is modeled as having two wheels along a central longitudinal axis. To execute a turn, the driver provides a steering input angle $\delta_v$ (e.g., corresponding to an angle from the central wheelbase in the bicycle model). This turn results in the vehicle 110 following a curved path around an instantaneous center of rotation $P_v$ with a radius of rotation $r_v$.

In order for the vehicle 110 to converge on the instantaneous center of rotation $P_v$ when following the curved path, the individual steering angles of the inside wheel (e.g., left wheel 502 for a left turn) and the outside wheel (e.g., right wheel 504 for a left turn) are not equal. Rather, the inside wheel 502 should turn at a greater angle than the outside wheel 504 because the inside wheel 502 turns along a circle having a slightly smaller radius than the outside wheel 504. Thus, the actual steer angle for the left and right wheels is not exactly $\delta_v$, but is a little smaller for the outside wheel and a little larger for the inside wheel. This geometrical relation is called the Ackermann steering geometry. Particularly, the Ackermann angle for the front steering system provides the correct left wheel steering angle $\delta_{v,L}$ and right wheel steering angle $\delta_{v,R}$ to achieve the overall steering input angle $\delta_{v,L}$ for the vehicle 110 that enables the vehicle to yaw about the single instant center $P_v$. The left wheel steering angle $\delta_{v,L}$ and right wheel steering angle $\delta_{v,R}$ are dependent on the vehicle geometric parameters (wheelbase $l_v$ and track width $T_v$) as well as the input steering angle $\delta_v$. Particularly, the corresponding Ackermann steering geometry for the front-steered vehicle is given by:

$$\delta_{v,R} = \delta_v + \arctan\left[\frac{l_v \cdot \frac{T_v}{2}}{l_v^2 + r_v^2 - r_v \cdot \frac{T_v}{2}}\right] \quad (6)$$

$$\delta_{v,L} = \delta_v + \arctan\left[\frac{-l_v \cdot \frac{T_v}{2}}{l_v^2 + r_v^2 - r_v \cdot \frac{T_v}{2}}\right] \quad (7)$$

The radius of curvature for the vehicle path is determined by the steering input angle as $$r_v = \frac{l_v}{\tan\delta_v}.$$

In the example of FIG. 5 where the vehicle 110 is turning left, the negative steering input $-\delta_v$ and the negative radius $-r_v$ indicate a counter-clockwise rotation from the top view. There exists some instantaneous center of rotation $P_v$ for any steering angle $\delta_v$, defined by the point of intersection between the line of axis of the rear axle 114 and the lines perpendicular to the front steered wheels 502 and 504. In the case where there is zero steering angle $\delta_v$, the instantaneous center of rotation $P_v$ is at infinity.

For the bicycle model, $\delta_{v,R}=\delta_{v,L}=\delta_v$. Therefore the relationship between the radius of curvature and the steering input angle is given by:

$$\tan\delta_v = \frac{l_v}{r_v} \quad (8)$$

The slip angle for each wheel of the vehicle 110 is defined as the angle between the velocity vector of the wheel and its orientation. The corresponding slip angles for each of the vehicle wheels are (in order of front right, front left, rear left and rear right) given by:

$$\alpha_{v,fR} = \arctan\left(\frac{V_v + a_v\omega_v}{U_v - \frac{T_v}{2}\omega_v}\right) - \delta_{v,L} \quad (9)$$

$$\alpha_{v,fL} = \arctan\left(\frac{V_v + a_v\omega_v}{U_v + \frac{T_v}{2}\omega_v}\right) - \delta_{v,R} \quad (10)$$

$$\alpha_{v,rL} = \arctan\left(\frac{V_v - b_v\omega_v}{U_v + \frac{T_v}{2}\omega_v}\right) \quad (11)$$

$$\alpha_{v,rR} = \arctan\left(\frac{V_v - b_v\omega_v}{U_v - \frac{T_v}{2}\omega_v}\right) \quad (12)$$

where $\omega_v = \dot{\psi}_v$ is the vehicle yaw rate (corresponding to a time derivative of the global yaw angle $\psi_v$ measured clockwise positive from vertical) and $(U_v, V_v)$ are the velocity components of the vehicle's CoM in the longitudinal and lateral directions respectively.

The dynamics of the vehicle 110 are further simplified when non-holonomic constraints are enforced such that the wheels of the vehicle 110 are only able to move in their orientation direction (i.e., no slip). For the rear wheels of the vehicle 110 (without steering) the lateral components (numerator of the expression in the arctangent function in equations (11) and (12)) of the velocity are zero. This condition will be satisfied if $V_v - b_v\omega_v = 0$. Thus, the non-holonomy results in a constraint of:

$$V_v = b_v\omega_v \quad (13)$$

By the steering geometry derived above, it is observed that $$\tan\delta_v = \frac{l_v}{r_v}.$$

However the no-slip constraint (i.e., $\alpha_{fv} = 0$) also means that the vehicle front wheel velocity lies on the front wheel plane:

$$\tan\delta_v = \frac{V_v + a_v\omega_v}{U_v} \quad (14)$$

Substituting (13) into (14) results in:

$$\tan\delta_v = \frac{l_v\omega_v}{U_v} \quad (15)$$

Or:

$$\omega_v = \frac{U_v\tan\delta_v}{l_v} \quad (16)$$

Figure 6:
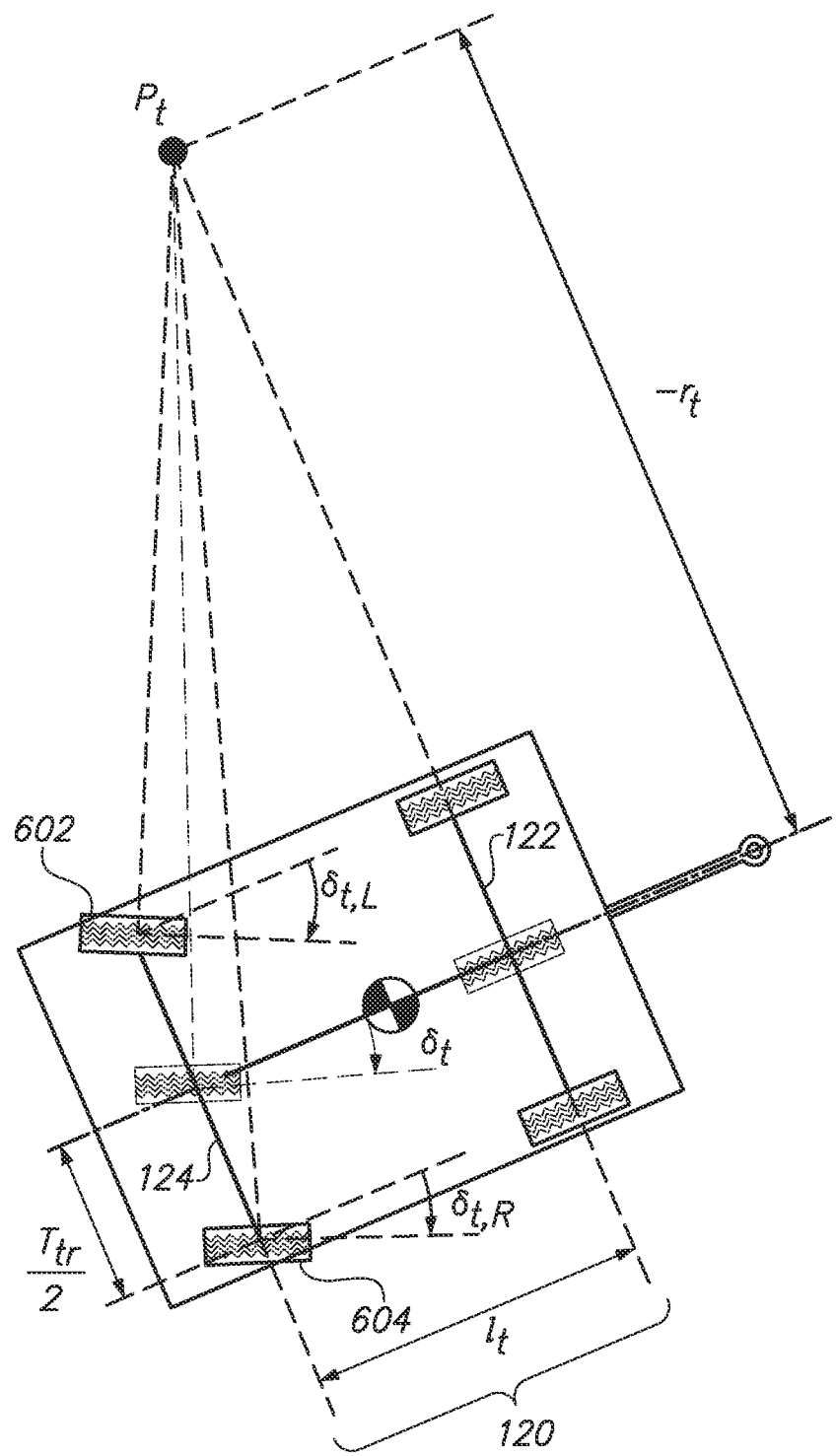
FIG. 6 is a geometric model of a trailer and a bicycle model of the trailer in accordance with an embodiment.

FIG. 6 is a geometric model of a trailer 120 that illustrates the trailer kinematics. Also illustrated in FIG. 6 is a "bicycle model" of the trailer 120 in which the trailer 120 is modeled as having two wheels along a central longitudinal axis. As described above, the inside and outside steering angles (e.g., for the left wheel 602 and the right wheel 604 respectively when executing a left turn) are not equal when the trailer 120 rotates about a single instantaneous center of rotation $P_t$. The Ackermann angle provides the correct left wheel steering angle $\delta_{t,L}$ and right wheel steering angle $\delta_{t,R}$ for the rear steering system in response to a rear steering input $\delta_t$:

$$\delta_{t,R} = \delta_t + \arctan\left[\frac{-l_t \cdot \frac{T_{tr}}{2}}{l_t^2 + r_t^2 - r_t \cdot \frac{T_{tr}}{2}}\right] \quad (17)$$

$$\delta_{t,L} = \delta_t + \arctan\left[\frac{l_t \cdot \frac{T_{tr}}{2}}{l_t^2 + r_t^2 - r_t \cdot \frac{T_{tr}}{2}}\right] \quad (18)$$

The radius of curvature of the trailer path is determined by its rear steering input angle $\delta_t$ as $-r_t = \frac{l_t}{\tan\delta_t}$.

The negative radius $-r_t$ indicates a counter-clockwise rotation when viewed from top. A positive input steering angle $\delta_t$ results in the counter-clockwise rotation due to the rear steering. There exists some instantaneous center of rotation $P_t$ for any steering angle $\delta_t$, defined by the point of intersection between the line of axis of the front axle 122 and the lines perpendicular to the rear steered wheels 602 and 604. In the case where there is zero steering angle $\delta_t$, the instantaneous center of rotation $P_t$ is at infinity.

In the case of the bicycle model, $\delta_{t,R} = \delta_{t,L} = \delta_t$, resulting in:

$$\tan\delta_t = \frac{l_t}{-r_t} \quad (19)$$

The slip angles for each of the trailer wheels is (in order of front right, front left, rear left and rear right) given by:

$$\alpha_{t,fR} = \arctan\left(\frac{V_t + a_t\omega_t}{U_t - \frac{T_{tf}}{2}\omega_t}\right) \quad (20)$$

$$\alpha_{t,fL} = \arctan\left(\frac{V_t + a_t\omega_t}{U_t + \frac{T_{tf}}{2}\omega_t}\right) \quad (21)$$

$$\alpha_{t,rL} = \arctan\left(\frac{V_t - b_t\omega_t}{U_t + \frac{T_{tr}}{2}\omega_t}\right) - \delta_{t,L} \quad (22)$$

$$\alpha_{t,rR} = \arctan\left(\frac{V_t - b_t\omega_t}{U_t - \frac{T_{tr}}{2}\omega_t}\right) - \delta_{t,R} \quad (23)$$

The dynamics of the trailer 120 are further simplified when imposing the non-holonomic constraints. For the front wheels of the trailer 120 (without steering) the lateral components (numerator of the expression in the arctagent function in equations (20) and (21)) of the velocity are zero. This condition will be satisfied if $V_t + a_t\omega_t = 0$. Therefore:

$$V_t = -a_t\omega_t \quad (24)$$

The non-holonomic constraint with zero slip also means Equation (16) becomes:

$$\tan(-\delta_t) = \frac{-V_t + b_t\omega_t}{U_t} \quad (25)$$

Substituting in Equation (24) into Equation (25) and rearranging yields:

$$\tan(-\delta_t) = \frac{l_t \omega_t}{U_t} \quad (26)$$

Or:

$$\omega_t = \frac{U_t \tan(-\delta_t)}{l_t} \quad (27)$$

For a given vehicle steering input $\delta_v$, the radius of curvature $r_v$ can be determined assuming that both front and rear axles of the vehicle rotate about the same instantaneous center $P_v$. In order for the vehicle and trailer to rotate together under the constraint of non-holonomy, the instantaneous centers of the vehicle $P_v$ and the trailer $P_t$ should be equivalent. This relationship between $r_v$ and $r_t$ is dependent on the hitch point geometry relative to both the vehicle 110 and the trailer 120. Assuming that the vehicle 110 is a rigid body, the radius of curvature for the hitch point $r_H$ is determined by the hitch length of the vehicle $c_v$ and the radius of curvature of the vehicle $r_v$. $r_H$ is also determined by the hitch length of the trailer $c_t$ and the trailer radius of curvature $r_t$. The relationships between $r_v$ and $r_t$ to $r_H$ are therefore:

$$c_v^2 + r_v^2 = r_H^2 \quad (28)$$

$$c_t^2 + r_t^2 = r_H^2 \quad (29)$$

Setting equations (28) and (29) equal to each other eliminates $r_H$, yielding:

$$c_v^2 + r_v^2 = c_t^2 + r_t^2 \quad (30)$$

For known $r_v$ (which can be determined from the vehicle steering angle $\delta_v$) and vehicle/trailer geometry parameters $c_t$, $c_v$, the radius of curvature $r_t$ of the trailer front wheel trajectory is given by:

$$r_t = \pm\sqrt{c_v^2 - c_t^2 + r_v^2} \quad (31)$$

where the positive square root is taken for $r_v > 0$ and negative square root for $r_v < 0$. The hitch angle $\theta$ between vehicle 110 and trailer 120 is also determined by the geometry and arc radii, given by:

$$\theta = \arctan\left(\frac{c_v}{-r_v}\right) + \arctan\left(\frac{c_t}{-r_t}\right) \quad (32)$$

The relationship between $\delta_v$ and $\delta_t$ is a nonlinear function of their geometric properties in which $\delta_t$ generally decreases with increasing $\delta_v$. In the case where $\delta_t = 0$ (i.e., a dual-axled trailer without steering) the only possible non-holonomic path is the trivial one, where the trailer is constrained to move forwards and backwards with zero lateral translation.

In non-holonomic motion, for any vehicle steering angle $\delta_v$ and longitudinal velocity $U_v$ the appropriate rear steering angle of the trailer and the motion of both vehicle/trailer about some instantaneous center of rotation can be computed. The steering input $\delta_v$ governs the trajectory of the vehicle and the longitudinal velocity $U_v$ governs the rate that the vehicle and trailer follow the prescribed trajectory. The resulting rear steering angle $\delta_t$ for non-holonomy is given by:

$$\delta_t = -\arctan\left(\frac{l_t}{\sqrt{c_v^2 - c_t^2 + r_v^2}}\right) \quad (33)$$

This results in an hitch angle $\theta$ between the vehicle and the trailer:

$$\theta = \arctan\left(\frac{c_t \tan \delta_t}{l_t}\right) - \arctan\left(\frac{c_v \tan \delta_v}{l_v}\right) \quad (34)$$

The hitch angle $\theta$ is therefore a function of the vehicle steering input $\delta_v$ assuming that the rear wheels are always steered to follow the path of the vehicle.

Figure 7:
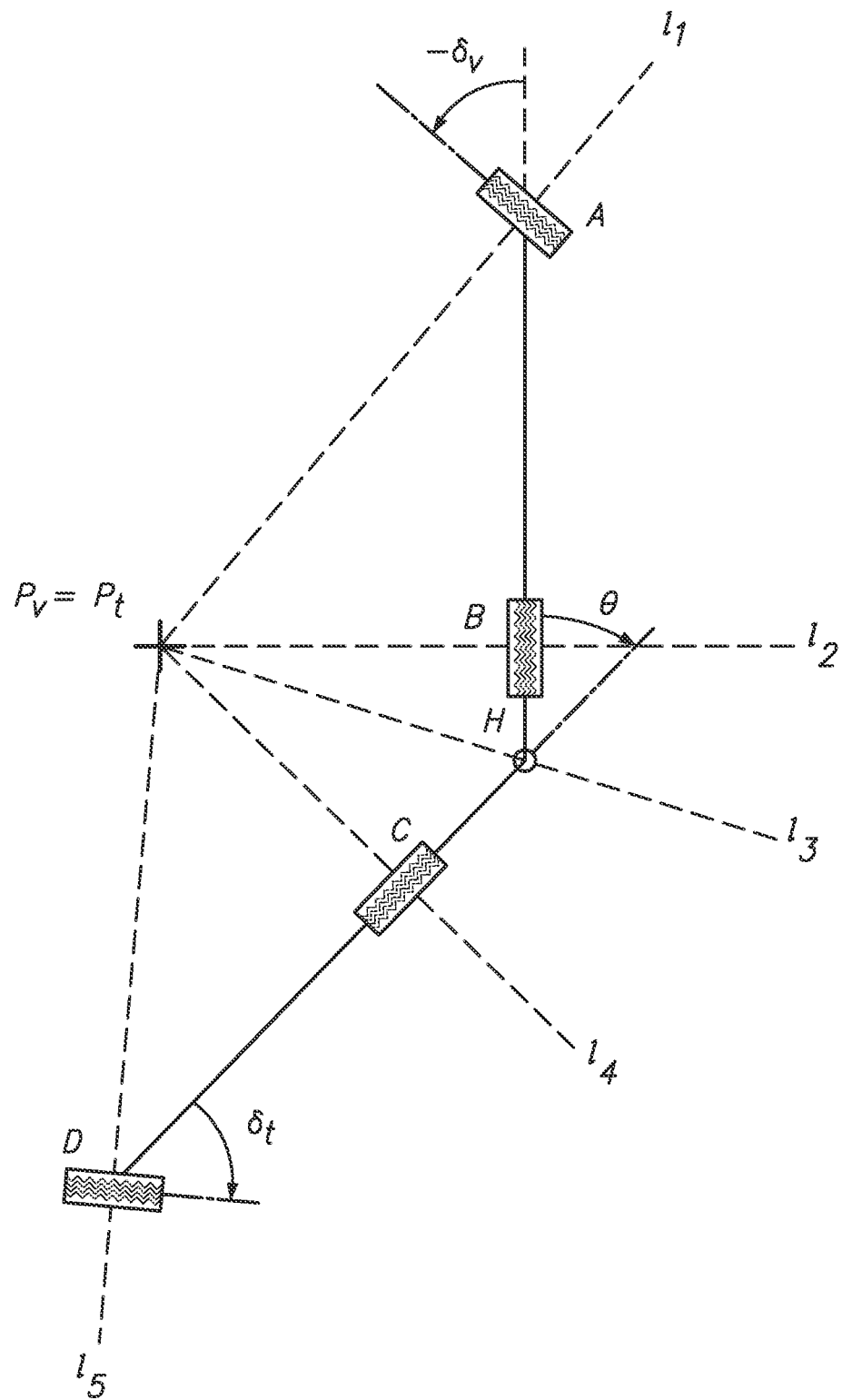
FIG. 7 is a geometric model illustrating no-slip conditions of a vehicle/trailer system in accordance with an embodiment.

The no-slip curve can also be derived from kinematics of the vehicle and trailer system as illustrated in FIG. 7. Considering a vehicle on its own that satisfies the non-holonomic constraint, the velocity vectors of each wheel are in-plane. For a rigid body in planar motion, the Instantaneous Center of Rotation (ICoR) is at the intersection of the lines perpendicular to the velocity vectors. Therefore, for any vehicle steering input $\delta_v$ an ICoR can be found for the vehicle $P_v$ that satisfies the non-holonomic constraint as the intersection of lines $l_1$ and $l_2$ perpendicular to the velocity vectors of the front and rear wheels respectively in the bicycle model of the vehicle 110. The hitch point is part of the vehicle rigid body and thus also rotates about point $P_v$, with a velocity vector perpendicular to $l_3$.

The hitch constrains the velocity at point H for both the vehicle and trailer but does not put any restrictions on the rotational motion. With known $\vec{v}_H$, it can be determined that the trailer ICoR $P_t$ also lies on $l_3$, as it is perpendicular to $\vec{v}_H$. The velocity of the trailer wheels are in-plane, therefore $l_4$ is perpendicular to the trailer orientation angle, resulting in a trailer ICoR $P_t$ at the intersection of $l_3$ and $l_4$. To complete the kinematic condition satisfying non-holonomy, the trailer steering angle $\delta_t$ is controlled such that a line $l_5$ perpendicular to the rear wheel of the trailer intersects $l_3$ and $l_4$ at $P_t$.

Additional Alternative Embodiments

The example embodiments described above include a controller for controlling steering of a trailer assumed to have no motive force. In an alternative embodiment, the controller may control a motive force of the trailer in addition to controlling steering. For example, the controller may determine a steering angle and a motive force of the trailer that causes the trailer to maintain a trajectory on or near the no-slip curve.

In one embodiment, the vehicle can be equipped with a camera facing rearward out of the back of the trailer. The operator views the camera and drives in reverse, steering as if the trailer was going forward and pulling the vehicle. For some operators, this simulation of the trailer pulling the vehicle may provide a more natural driving experience. The trailer controller 250 operates in the same manner described above to control steering of the trailer in response to the driver's actions.

In another embodiment, the controller may control steering of both the vehicle and the trailer. For example, in one embodiment, a panning camera may be included in the vehicle. The driver approaches the target and then stops the vehicle before beginning the reverse drive maneuver. The driver then uses a panning camera to select a desired orientation and position of the vehicle/trailer system. A controller then automatically calculates a feasible path and automatically controls the steering angles of both the vehicle and the trailer accordingly to position and desired path, while the drive controls only the speed of the vehicle/trailer.

In another embodiment, a similar panning camera may be used, but rather than control steering of the vehicle directly, a controller instead generates a "virtual trench" that is displayed to the driver. The drive then controls both speed and path of the vehicle while using the virtual trench to assist decision making.

In another alternative embodiment, the controller 250 may apply a different predefined mapping may that does not necessarily control the trailer steering according to a no-slip curve. For example, a different predefined mapping may be used that still stabilizes the motion and prevents jack knifing and binding of the vehicle/trailer system 100 without necessarily corresponding to a no-slip curve.

Upon reading this disclosure, those of skill in the art will appreciate still additional alternative designs having the features described herein. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the embodiments disclosed herein without departing from the spirit and scope of the embodiments as defined in the appended claims.

The invention claimed is:

1. A method for controlling steering of a trailer in a reverse drive maneuver, the trailer and a vehicle coupled at a hitch, the vehicle having a front axle with steerable front wheels and a rear axle with non-steerable rear wheels, and the trailer having a rear axle with steerable rear wheels and a front axle with non-steerable front wheels, the method comprising:
   receiving, by a controller device, an operator-controlled vehicle steering angle for steering the vehicle during the reverse drive maneuver;
   receiving, by the controller device, a measured hitch angle representing an angle between the vehicle and the trailer at the hitch;
   determining, by the controller device, a trailer steering angle that causes the steerable rear wheels of the trailer to follow a trajectory of the vehicle about an instantaneous center of rotation of both the vehicle and the trailer with no lateral slippage in connection with at least a determined radius of curvature of the vehicle, the hitch angle, and the operator-controlled vehicle steering angle; and
   controlling steering of the trailer during the reverse drive maneuver using the trailer steering angle.

2. The method of claim 1, wherein determining the trailer steering angle comprises:
   mapping the operator-controlled vehicle steering angle to a reference hitch angle and a feedforward reference trailer steering angle according to a predetermined mapping;
   generating a steering compensation signal based on a difference between the reference hitch angle and the measured hitch angle; and
   generating the trailer steering angle based on the feedforward reference trailer steering angle and the steering compensation signal.

3. The method of claim 2, wherein generating the steering compensation signal comprises:
   generating a hitch angle error signal representing the difference between the reference hitch angle and the measured hitch angle; and
   generating the steering compensation signal based on a proportional gain and an integral gain of the hitch angle error signal.

4. The method of claim 2, wherein generating the steering compensation signal comprises:
   generating a hitch angle error signal representing the difference between the reference hitch angle and the measured hitch angle; and
   generating the steering compensation signal based on a proportional gain, an integral gain, and a derivative gain of the hitch angle error signal.

5. The method of claim 2, wherein generating the trailer steering angle comprises:
   generating the trailer steering angle as having a magnitude greater than a magnitude of the feedforward reference trailer steering angle to reduce a magnitude of the hitch angle error signal.

6. The method of claim 1, further comprising:
   periodically updating the trailer steering angle such that the operator-controlled steering angle, the hitch angle, and the trailer steering angle comprises a point having a distance within five degrees of a predetermined no-slip curve in a three-dimensional hitch space having a vehicle steering angle axis, a hitch angle axis, and a trailer steering angle axis, the no-slip curve representing a set of possible states of the vehicle and the trailer that meet a no-slip condition.

7. The method of claim 1, further comprising:
   periodically updating the trailer steering angle such that the operator-controlled steering angle, the hitch angle, and the trailer steering angle comprises a point having a distance within five degrees of a predetermined linear approximation of a no-slip curve in a three-dimensional hitch space having a vehicle steering angle axis, a hitch angle axis, and a trailer steering angle axis, the predetermined linear approximation of the no-slip curve representing a set of possible states of the vehicle and the trailer that meet a linear approximation of a no-slip condition.

8. A trailer control system for controlling steering of a trailer in a reverse drive maneuver, the trailer and a vehicle coupled at a hitch, the vehicle having a front axle with steerable front wheels and a rear axle with non-steerable rear wheels, and the trailer having a rear axle with steerable rear wheels and a front axle with non-steerable front wheels, the controller comprising:
   a hitch angle sensor to sense a hitch angle formed by the vehicle and the trailer at the hitch;
   a trailer controller to receive an operator-controlled vehicle steering angle for steering the vehicle during the reverse drive maneuver, and the trailer controller to determine a trailer steering angle that causes the steerable rear wheels of the trailer to follow a trajectory of the vehicle about an instantaneous center of rotation of both the vehicle and the trailer with no lateral slippage in connection with at least a determined radius of curvature of the vehicle, the hitch angle, and the operator-controlled vehicle steering angle; and
   an actuation controller to control an actuator of the rear axle of the trailer during the reverse drive maneuver based on the trailer steering angle.

9. The trailer control system of claim 8, wherein the trailer controller comprises:
   a mapping engine comprising a memory to store a predetermined mapping of the operator-controlled vehicle steering angle to a reference hitch angle and a feedforward reference trailer steering angle;

a feedback controller to generate a steering compensation signal based on a difference between the reference hitch angle and the measured hitch angle; and a combiner to generate the trailer steering angle based on the feedforward reference trailer steering angle and the steering compensation signal.

10. The trailer control system of claim 9, wherein the feedback controller comprises a proportional-integral feedback controller.

11. The trailer control system of claim. 9, wherein the feedback controller comprises a proportional-integral-derivative feedback controller.

12. The trailer control system of claim 9, wherein generating the trailer steering angle comprises:
generating the trailer steering angle as having a magnitude greater than a magnitude of the feedforward reference trailer steering angle to reduce a magnitude of the hitch angle error signal.

13. The trailer control system of claim 8, wherein the trailer controller is further configured to periodically update the trailer steering angle such that the operator-controlled steering angle, the hitch angle, and the trailer steering angle comprises a point having a distance within 5 degrees of a predetermined no-slip curve in a three-dimensional hitch space having a vehicle steering angle axis, a hitch angle axis, and a trailer steering angle axis, the no-slip curve representing a set of possible states of the vehicle and the trailer that meet a no-slip condition.

14. The trailer control system of claim 8, wherein the trailer controller is further configured to periodically update the trailer steering angle such that the operator-controlled steering angle, the hitch angle, and the trailer steering angle comprises a point having a distance within 5 degrees of a predetermined linear approximation of a no-slip curve in a three-dimensional hitch space having a vehicle steering angle axis, a hitch angle axis, and a trailer steering angle axis, the predetermined linear approximation of the no-slip curve representing a set of possible states of the vehicle and the trailer that meet a linear approximation of a no-slip condition.

15. A method for controlling steering of a trailer in a reverse drive maneuver, the trailer and a vehicle coupled at a hitch, the vehicle having a front axle with steerable front wheels and a rear axle with non-steerable rear wheels, and the trailer having a rear axle with steerable rear wheels and a front axle with non-steerable front wheels. the method comprising:
receiving, by a controller device, an operator-controlled vehicle steering angle for steering the vehicle during the reverse drive maneuver;
mapping, by the controller device, the operator-controlled vehicle steering angle to a reference hitch angle and a feedforward reference trailer steering angle according to a predetermined mapping;
receiving, by the controller device, a measured hitch angle representing an angle between the vehicle and the trailer at the hitch;
generating, by the controller device, a trailer steering angle based on the feedforward reference trailer steering angle and the steering compensation signal, the trailer steering angle causing the steerable rear wheels of the trailer to follow a trajectory of the vehicle about an instantaneous center of rotation of both the vehicle and the trailer with no lateral slippage in connection with at least a determined radius of curvature of the vehicle, the hitch angle, and the operator-controlled vehicle steering angle; and
controlling, by the controller device, steering of the trailer using the trailer steering angle.

16. The method of claim 15, wherein generating the steering compensation signal comprises:
generating a hitch angle error signal representing the difference between the reference hitch angle and the measured hitch angle; and
generating the steering compensation signal based on a proportional gain and an integral gain of the hitch angle error signal.

17. The method of claim 15, wherein generating the steering compensation signal comprises:
generating a hitch angle error signal representing the difference between the reference hitch angle and the measured hitch angle; and
generating the steering compensation signal based on a proportional gain, an integral gain, and a derivative gain of the hitch angle error signal.

18. The method of claim 15, wherein generating the trailer steering angle comprises:
generating the trailer steering angle as having a magnitude greater than a magnitude of the feedforward reference trailer steering angle to reduce a magnitude of the hitch angle error signal.

19. The method of claim 15, further comprising:
periodically updating the trailer steering angle such that operator-controlled steering angle, the hitch angle, and the trailer steering angle comprises a point having a distance within five degrees of the predetermined curve in a three-dimensional hitch space having a vehicle steering angle axis, a hitch angle axis, and a trailer steering angle axis.

20. The method of claim 15, further comprising:
periodically updating the trailer steering angle such that the operator-controlled steering angle, the hitch angle, and the trailer steering angle comprises a point having a distance within ten degrees of the predetermined curve in a three-dimensional hitch space having a vehicle steering angle axis, a hitch angle axis, and a trailer steering angle axis.

21. The method of claim 1, wherein the trailer follows a trajectory within a predefined tolerance of a no-slip condition given the hitch angle and the operator-controlled vehicle steering angle.

22. The trailer control system of claim 8, wherein the trailer follows a trajectory within a predefined tolerance of a no-slip condition given the hitch angle and the operator-controlled vehicle steering angle.

* * * * *